(12) United States Patent
Lev et al.

(10) Patent No.: US 12,181,695 B2
(45) Date of Patent: Dec. 31, 2024

(54) RETROREFLECTOR

(71) Applicant: NEC Corporation Of America, Herzlia (IL)

(72) Inventors: Tsvi Lev, Tel-Aviv (IL); Hagai Har-Gil, Ramat Gan (IL)

(73) Assignee: NEC Corporation Of America, Herzlia (IL)

( * ) Notice: Subject to any disclaimer, the term of this patent is extended or adjusted under 35 U.S.C. 154(b) by 267 days.

(21) Appl. No.: 17/851,099

(22) Filed: Jun. 28, 2022

(65) Prior Publication Data
US 2023/0288618 A1 Sep. 14, 2023

Related U.S. Application Data

(63) Continuation-in-part of application No. 17/689,109, filed on Mar. 8, 2022.

(51) Int. Cl.
*G02B 5/122* (2006.01)
*G02B 5/126* (2006.01)

(52) U.S. Cl.
CPC ............ *G02B 5/122* (2013.01); *G02B 5/126* (2013.01)

(58) Field of Classification Search
CPC ................................ G02B 5/122; G02B 5/126
See application file for complete search history.

(56) References Cited

U.S. PATENT DOCUMENTS

| | | | |
|---|---|---|---|
| 5,835,271 A * | 11/1998 | Stump | E01F 9/524 359/531 |
| 6,215,519 B1 | 4/2001 | Nayar et al. | |
| 9,196,056 B2 | 11/2015 | Hall | |
| 10,298,908 B2 | 5/2019 | Retterath | |
| 10,972,655 B1 | 4/2021 | Ostap et al. | |
| 11,117,570 B1 | 9/2021 | Broggi | |
| 11,436,752 B1 | 9/2022 | Rublee | |
| 2005/0185279 A1* | 8/2005 | Mullen | G02B 5/124 359/530 |
| 2005/0278098 A1 | 12/2005 | Breed | |
| 2008/0212182 A1* | 9/2008 | Nilsen | G02B 5/124 359/530 |

(Continued)

FOREIGN PATENT DOCUMENTS

| | | |
|---|---|---|
| CA | 2729712 | 12/2009 |
| EP | 3547277 | 10/2019 |

(Continued)

OTHER PUBLICATIONS

Official Action Dated Apr. 3, 2024 from the US Patent and Trademark Office Re. U.S. Appl. No. 17/741,476. (26 pages).

(Continued)

*Primary Examiner* — Hugh Maupin

(57) ABSTRACT

There is provided a retroreflector device, comprising: an incident object made of a material transparent to electromagnetic radiation, the incident object designed to refract an incident ray hitting an incident surface to generate a refracted ray that hits a back surface, and a retroreflective surface positioned in proximity to the back surface of the incident object, wherein the retroreflective surface and the incident object are configured to refract the incident ray to generate the refracted ray for hitting the retroreflective surface at an angle of incidence below a threshold.

21 Claims, 14 Drawing Sheets

(56) References Cited

U.S. PATENT DOCUMENTS

| | | | |
|---|---|---|---|
| 2009/0190237 A1* | 7/2009 | Silverstein | G02F 1/133606 359/726 |
| 2010/0322471 A1 | 12/2010 | Treado et al. | |
| 2014/0129073 A1 | 5/2014 | Ferguson | |
| 2015/0288948 A1 | 10/2015 | Schamp et al. | |
| 2016/0086018 A1 | 3/2016 | Lemoff | |
| 2017/0059398 A1* | 3/2017 | Tennant | G01J 5/0806 |
| 2017/0191822 A1 | 7/2017 | Becker et al. | |
| 2017/0270375 A1 | 9/2017 | Grauer | |
| 2017/0328729 A1 | 11/2017 | Zhu et al. | |
| 2017/0363887 A1 | 12/2017 | Uyeno et al. | |
| 2018/0081094 A1* | 3/2018 | Aikin | G05D 1/028 |
| 2019/0095721 A1 | 3/2019 | Ion et al. | |
| 2019/0120967 A1 | 4/2019 | Smits | |
| 2020/0255030 A1 | 8/2020 | Yamamoto et al. | |
| 2020/0274998 A1 | 8/2020 | Herman et al. | |
| 2020/0309688 A1 | 10/2020 | Park et al. | |
| 2021/0190962 A1 | 6/2021 | Maimon et al. | |
| 2021/0199769 A1 | 7/2021 | Meylan | |
| 2021/0275084 A1 | 9/2021 | Tversky | |
| 2021/0323556 A1 | 10/2021 | Matsumura et al. | |
| 2022/0003665 A1 | 1/2022 | Swenson et al. | |
| 2022/0057519 A1 | 2/2022 | Goldstein et al. | |
| 2022/0095923 A1 | 3/2022 | Seybold et al. | |
| 2022/0137218 A1* | 5/2022 | Onal | G01S 7/4868 356/4.01 |
| 2023/0247313 A1 | 8/2023 | Paris et al. | |
| 2023/0290000 A1 | 9/2023 | Lev et al. | |
| 2023/0290181 A1 | 9/2023 | Lieber et al. | |
| 2023/0292013 A1 | 9/2023 | Lieber et al. | |
| 2023/0292015 A1 | 9/2023 | Hoch | |
| 2023/0316789 A1 | 10/2023 | Tsafrir et al. | |
| 2023/0326253 A1 | 10/2023 | Shishido et al. | |

FOREIGN PATENT DOCUMENTS

| | | |
|---|---|---|
| ES | 2554549 | 12/2015 |
| SG | 191452 | 7/2013 |
| WO | WO 2008/129552 | 10/2008 |
| WO | WO 2011/101856 | 8/2011 |

OTHER PUBLICATIONS

Steiner et al. "Design of an Active Multispectral SWIR Camera System for Skin Detection and Face Verification", Safety and Security Research Institute (ISF), Bonn-Rhein-Sieg University of Applied Sciences, Grantham-Allee 20, 53757 Sankt Augustin, Germany, Hindawi Publishing Corporation, vol. 2016 | Article ID 9682453, 1-16, Nov. 16, 2015.

Minaee et al. "Deep-Emotion: Facial Expression Recognition Using Attentional Convolutional Network", ArXiv Preprint ArXiv:1902.01019v1, p. 1-8, Feb. 4, 2019.

Notice of Allowance Dated May 1, 2024 from the US Patent and Trademark Office Re. U.S. Appl. No. 17/741,476. (11 pages).

Official Action Dated Jan. 30, 2024 From the US Patent and Trademark Office Re. U.S. Appl. No. 17/872,086. (16 Pages).

Official Action Dated Feb. 13, 2024 from the US Patent and Trademark Office Re. U.S. Appl. No. 17/689,109. (27 pages).

Notice of Allowance Dated Jun. 20, 2024 From the US Patent and Trademark Office Re. U.S. Appl. No. 17/872,086. (13 Pages).

Notice of Allowance Dated May 22, 2024 from the US Patent and Trademark Office Re. U.S. Appl. No. 17/689,109. (19 Pages).

Official Action Dated Jul. 1, 2024 From the US Patent and Trademark Office Re. U.S. Appl. No. 17/872,067. (42 Pages).

\* cited by examiner

RETROREFLECTOR

RELATED APPLICATION

This application is a Continuation-in-part of U.S. Utility patent application Ser. No. 17/689,109 filed on Mar. 8, 2022, the contents of which are incorporated by reference as if fully set forth herein.

FIELD AND BACKGROUND OF THE INVENTION

The present invention, in some embodiments thereof, relates to optical devices and, more particularly, but not exclusively, to retroreflectors.

A retroreflector is designed to reflect electromagnetic radiation back towards its source for different angles of incidence. A retroreflector is different than a reflective surface such as a mirror, that reflects the incoming electromagnetic radiation back towards its source only for angles of incidence of zero. Retroreflectors are used, for example, for safety application, for example, placed on life jackets to allow detection at sea, and placed on street signs to improve visibility of the signs to oncoming cars.

SUMMARY OF THE INVENTION

According to a first aspect, a retroreflector device comprises: an incident object made of a material transparent to electromagnetic radiation, the incident object designed to refract an incident ray hitting an incident surface to generate a refracted ray that hits a back surface, and a retroreflective surface positioned in proximity to the back surface of the incident object, wherein the retroreflective surface and the incident object are configured to refract the incident ray to generate the refracted ray for hitting the retroreflective surface at an angle of incidence below a threshold.

In a further implementation form of the first aspect, the retroreflector device is configured to return the electromagnetic radiation substantially along the same path of the incident ray for an angle of incidence of the incident ray hitting the incident surface at about 50-89 degrees.

In a further implementation form of the first aspect, the threshold is defined as a value above which the retroreflector surface ceases to effectively return the electromagnetic radiation substantially along the same path of the incident ray.

In a further implementation form of the first aspect, the threshold is about 45 degrees.

In a further implementation form of the first aspect, the retroreflective surface comprises small reflective prisms, and the incident object is larger than an individual reflective prism by at least 10 times.

In a further implementation form of the first aspect, a length of the individual reflective prism is about 10-100 micrometers, and a length of the incident object is at least 1 millimeter.

In a further implementation form of the first aspect, the incident surface includes a portion thereof shaped substantially as a surface of a sphere, wherein an angle of incidence of the incident ray is about 90 degrees when hitting the surface of the sphere.

In a further implementation form of the first aspect, the retroreflective surface is placed in direct contact with the back surface of the incident object without an air gap therebetween.

In a further implementation form of the first aspect, the incident object is made of a resilient material designed to protect the retroreflective surface from damage from an external environment.

In a further implementation form of the first aspect, the retroreflector device comprises a plurality of incident objects each having the incident surface shaped substantially as a sphere, and the retroreflective surface adhered to the back surface, wherein the plurality of incident objects are positioned over a surface of an object. In a further implementation form of the first aspect, the incident object is shaped approximately as a half sphere with a substantially flat bottom connected to a cylinder, and the retroreflective surface comprises a first portion covering the substantially flat bottom and a second portion arranged as a band covering the cylinder.

In a further implementation form of the first aspect, the electromagnetic radiation comprises short wave infrared (SWIR), and wherein the incident surface is positioned behind a barrier made out of a material selected for being opaque to visible light and non-opaque to SWIR.

In a further implementation form of the first aspect, the retroreflective surface is disposed within the incident object.

According to a second aspect, a system comprises: the retroreflector device according to any of the implementations of the first aspect, an illumination element that generates electromagnetic radiation, a sensor that captures at least one image at least at the electromagnetic radiation, and at least one processor that analyzes the at least one image for detecting the retroreflector according to a reflection of the electromagnetic radiation generated by the illumination element reflected back from the retroreflector device.

In a further implementation form of the second aspect, the illumination element is positioned to direct the electromagnetic radiation as incident rays at a high angle of incidence in the range of 50-89 to the incident surface of the incident object of the retroreflector device.

In a further implementation form of the second aspect, the retroreflector device is positioned in parallel to a surface of an earth, and an angle formed by the illumination element, the retroreflector device, and the surface of the earth is the high angle of incidence.

In a further implementation form of the second aspect, the illumination element generates the electromagnetic energy at a selected illumination pattern, and the at least one processor analyzes the at least one image for detecting the retroreflector by detecting the selected illumination pattern.

According to a third aspect, A retroreflector device, comprises: a substrate comprising a binding surface, and at least one retroreflective surface positioned at an angle relative to the binding surface of the substrate, wherein the angle is selected for an incident ray to hit the at least one retroreflective surface at an angle of incidence below a threshold in which the at least one retroreflective surface generates a reflected ray back towards the source that generated the incident ray, when an angle between the incident ray and a normal of the binding surface is above the threshold.

In a further implementation form of the third aspect, a height of the substrate and the at least one retroreflective surface positioned at the angle is less than about 4 millimeters (mm).

In a further implementation form of the third aspect, the angle of the at least one retroreflective surface relative to the binding surface is greater than about 30 degrees when the threshold of the incidence ray and the normal of the binding surface is less than about 80 degrees.

In a further implementation form of the third aspect, further comprising a protective transparent coating overlaying the at least one retroreflective surface and the binding surface of the substrate, the protective transparent coating is made of a resilient material selected to withstand pressure applied by vehicles driving over the retroreflector device.

In a further implementation form of the third aspect, further comprising a coating that is substantially opaque to electromagnetic energy in the visible range and substantially transparent to electromagnetic energy in the near infrared range.

In a further implementation form of the third aspect, the coating is colored similarly to a color of a background surface on which the retroreflector device is placed.

According to a fourth aspect, a computer method of detecting an optical marker, comprises: using at least one processor for: generating instructions for activating an illumination element that generates a time modulated electromagnetic illumination pattern, accessing a plurality of sequential images captured by a sensor depicting a reflection of the time modulated electromagnetic illumination pattern off an optical marker, and analyzing the plurality of sequential images to detect the presence of the optical marker by extracting a time-modulated pattern relative to a background of the plurality of sequential images correlated with the time modulated electromagnetic illumination pattern.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 9:
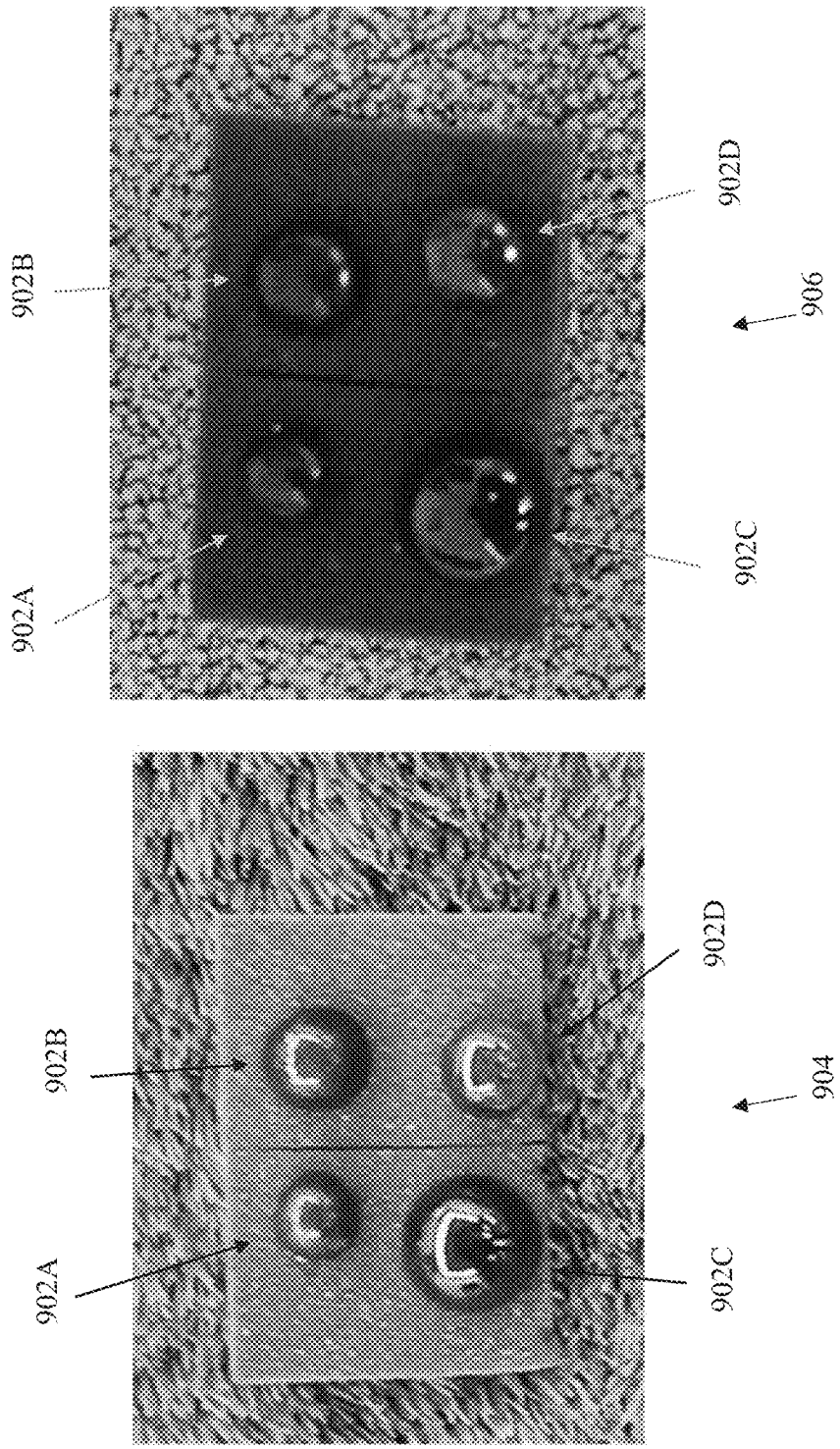
FIG. 9 depicts another experiment performed by Inventors, in accordance with some embodiments of the present invention.
Figure 10:
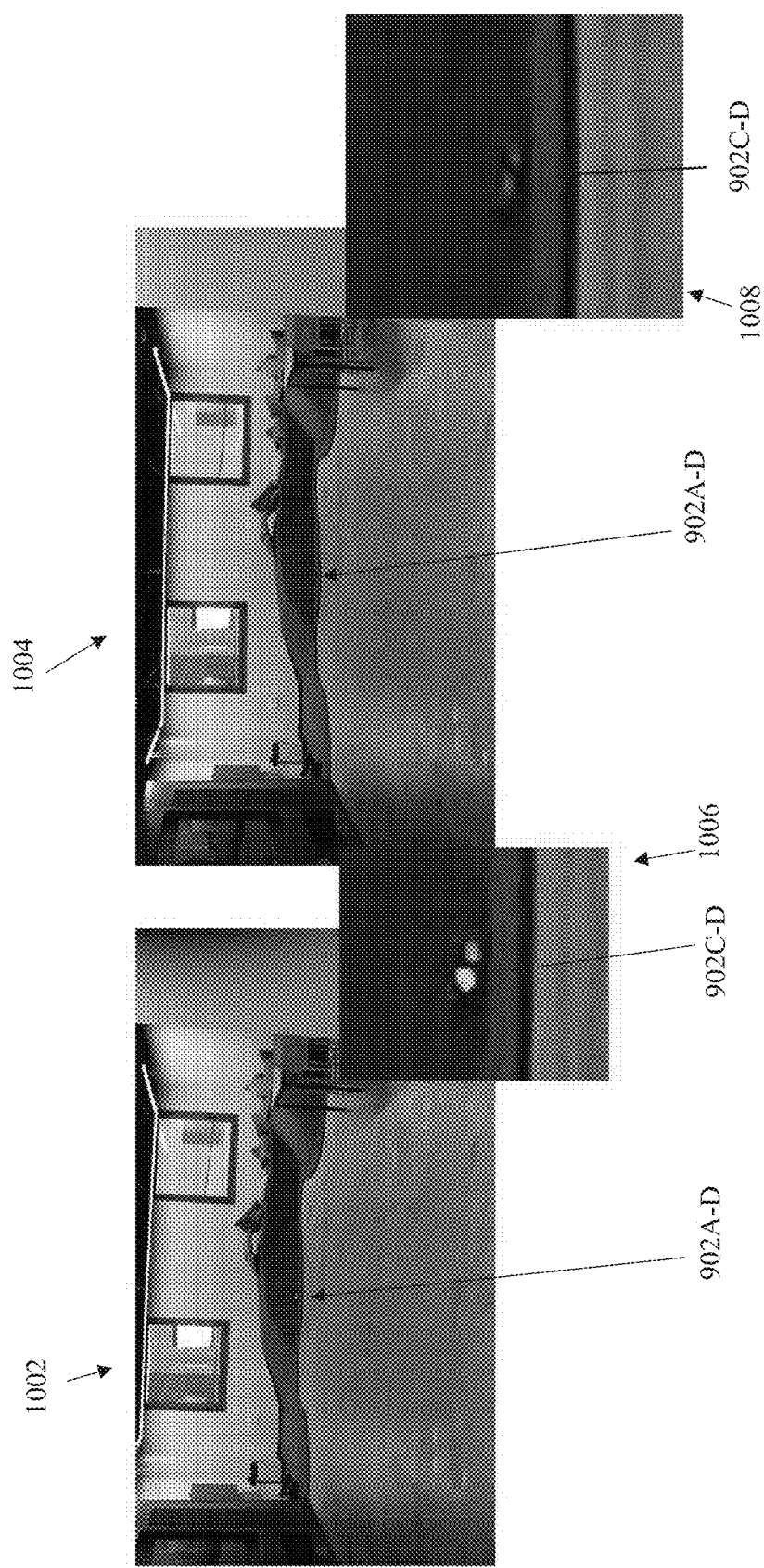
Figure 11:
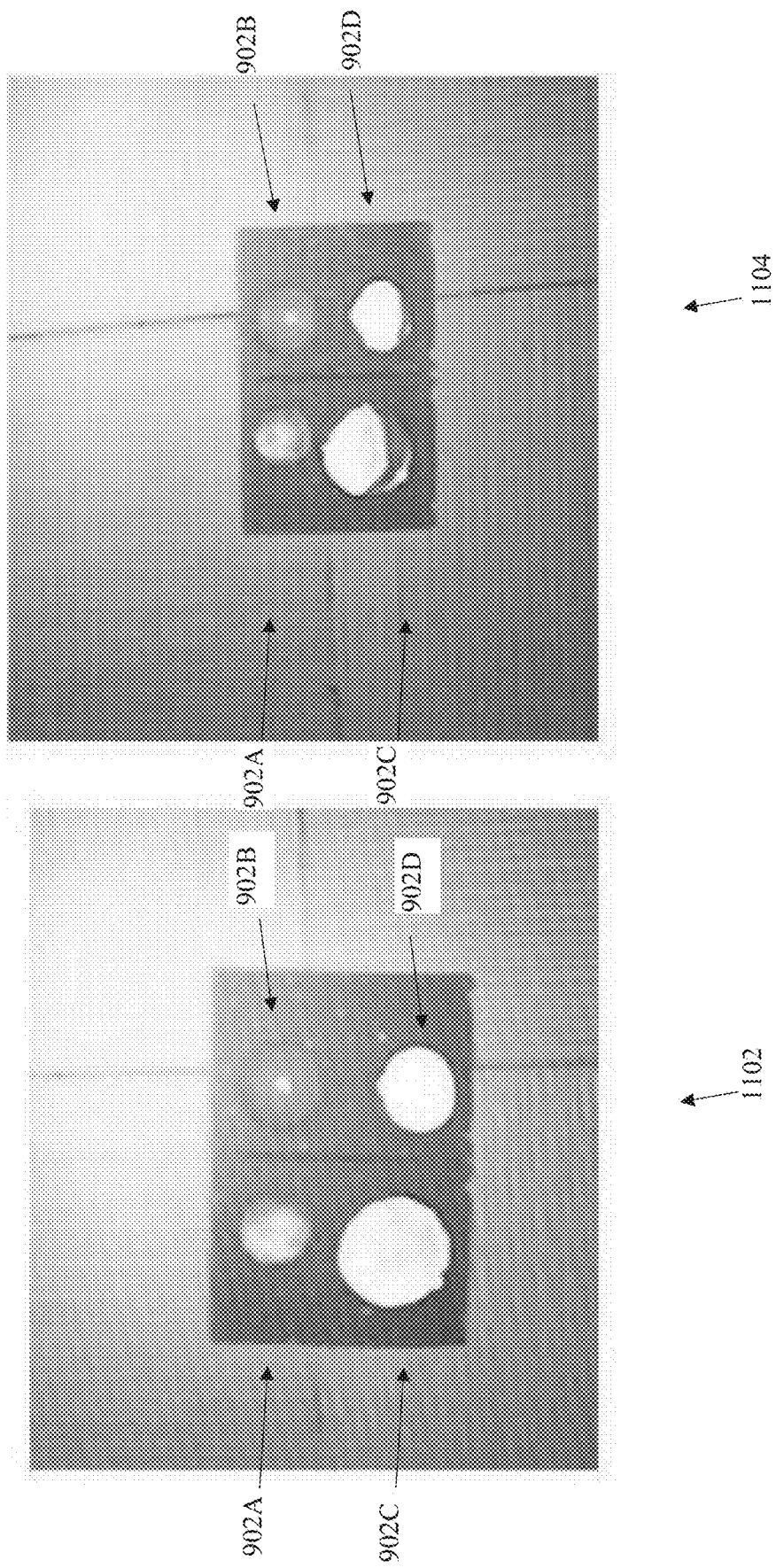
Figure 12:
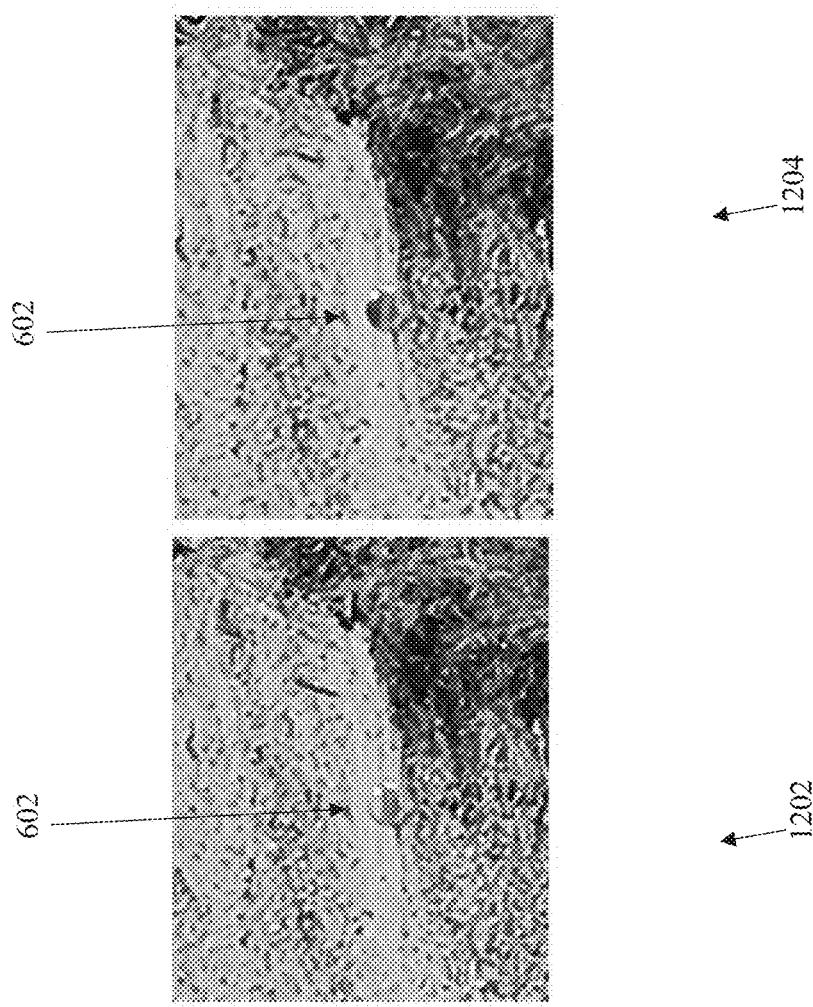
Figure 13:
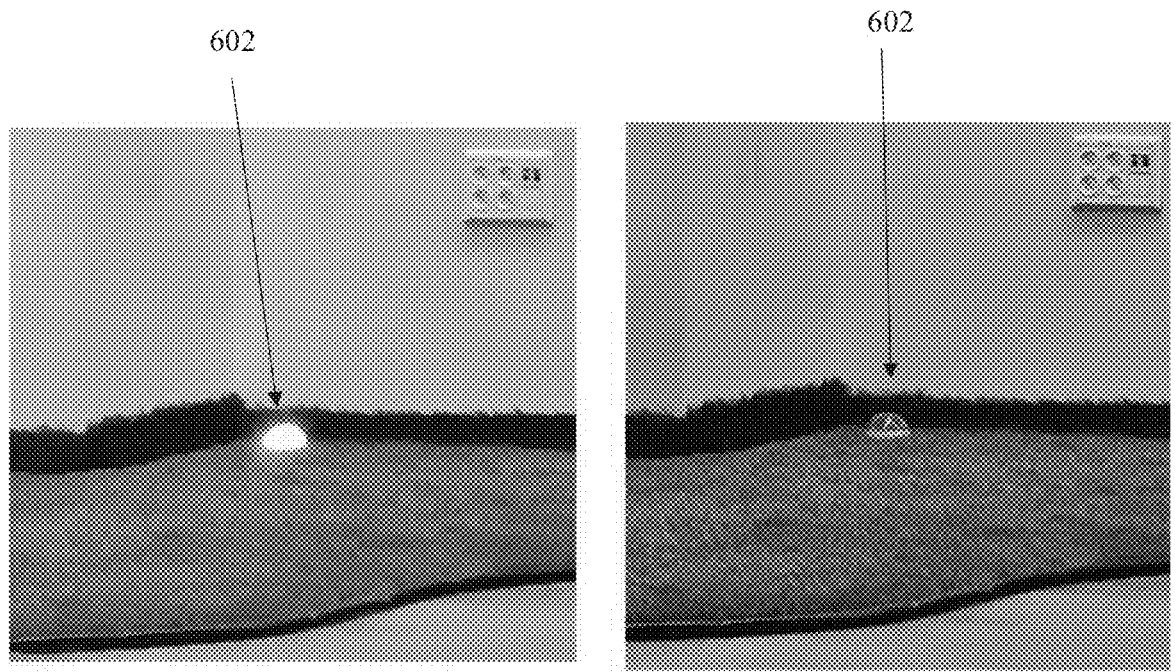
Figure 14:
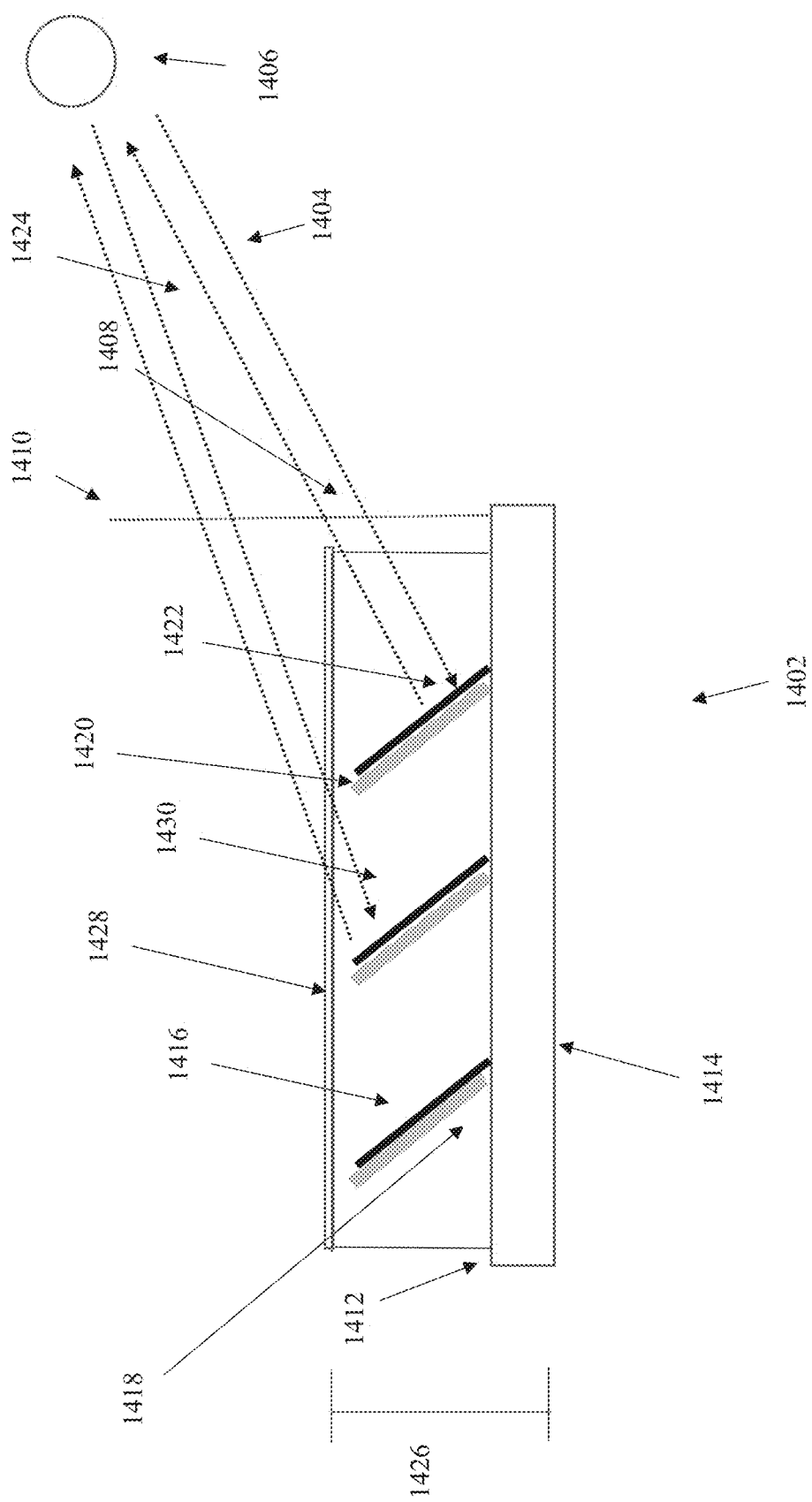

FIG. 10 includes schematics depicting retroreflective devices of FIG. 9 under different environmental conditions, in accordance with some embodiments of the present invention;

FIG. 11 includes schematics depicting retroreflective devices of FIG. 9 under different environmental conditions, in accordance with some embodiments of the present invention;

FIG. 12 includes schematics depicting a retroreflective device as described with reference to FIG. 6, in accordance with some embodiments of the present invention;

FIG. 13 includes schematics depicting a retroreflective device as described with reference to FIG. 6, in accordance with some embodiments of the present invention; and FIG. 14 is a schematic of an exemplary retroreflector device designed to reflect incident light back towards a source of illumination for incident electromagnetic radiation at an angle of incidence relative to a normal of a surface of retroreflector device above a threshold, in accordance with some embodiments of the present invention.

DESCRIPTION OF SPECIFIC EMBODIMENTS OF THE INVENTION

The present invention, in some embodiments thereof, relates to optical devices and, more particularly, but not exclusively, to retroreflectors.

As used herein, the terms retroreflector device and retroflective device are used interchangeably.

As used herein, the term angle of incidence refers to the angle between an incident ray of electromagnetic radiation hitting a surface of an incident object and/or a retroreflective surface, and a normal to the surface at the point of incidence. The incident ray generated by a source of illumination hits the incident surface of the incident object. The ray hitting the retroreflective surface is a refraction of the incident ray, which is refracted at the incident surface. For example, a low angle of incidence (e.g., zero) refers to the incident ray hitting the incident surface head-on, i.e., perpendicular to the incident surface. A high angle of incidence (e.g., 89 degrees) refers to the incident ray travelling almost in parallel to the incident surface, i.e., the incident ray just grazes the surface.

An aspect of some embodiments of the present invention relates to a retroreflector device, designed to return a substantial amount of incident light towards an illumination source at angles of incidence up to a threshold, which include high angles of incidence, for example, about 40-89, or about 50-89, or about 50-80, or about 40, 45, 50, 60, 70, 80, or 85 degrees, or other intermediate or larger angles. The retroreflector device includes an incident object and a retroreflective surface. The incident object is made of a material transparent to electromagnetic radiation generated by an illumination source. The incident object is designed to refract an incident ray hitting an incident surface of the incident object, to generate a refracted ray that hits a back surface of the incident object. A further role of the incident object is to protect the retroreflective surface from direct exposure to the environment. For example, the incident object may be made of resilient material (e.g., glass, plastic) so that the retroreflector device can be placed on surfaces such as pavements, roads, and the earth, and sustain both the weather as well as the wear and tear due to passing vehicles and pedestrians. The retroreflective surface is attached to the back surface of the incident object, in direct contact with the back surface without an air gap. The retroreflective surface and the incident object are designed to refract the incident ray to generate the refracted ray for hitting the retroreflective surface at an angle of incidence below a threshold, above which the retroreflector surface ceases to effectively return electromagnetic energy substantially along the same path of the incident ray towards the illumination source. It is noted that the threshold of angles above which the retroreflector surface ceases to effectively return light is not the result of a design choice, but rather a limitation with no simple workaround. Implementations described provide a "workaround" in view of the threshold limitation of the retroreflector surface, providing retroreflector devices that efficiently return electromagnetic radiation even at high angles of incidence.

An aspect of some embodiments of the present invention relates to a retroreflector device, designed to return a substantial amount of incident light towards an illumination source at angles of incidence up to a threshold, which include high angles of incidence, for example, about 40-89, or about 50-89, or about 50-80, or about 40, 45, 50, 60, 70, 80, or 85 degrees, or other intermediate or larger angles. The retroreflector device, includes a substrate with a binding surface, and one or more retroreflective surfaces positioned at an angle relative to the binding surface of the substrate. The angle at which the retroreflector surface(s) are positioned relative to the surface of the substrate is selected for an incident ray to hit the at least one retroreflective surface at an angle of incidence below a threshold in which the at least one retroreflective surface generates a reflected ray back towards the source that generated the incident ray, when an angle between the incident ray and a normal of the binding surface is above the threshold, for example, about 40-89, or about 50-89, or about 50-80, or about 40, 45, 50, 60, 70, 80, or 85 degrees, or other intermediate or larger angles. The retroreflector device may be positioned, for example, flat on a road, while reflecting headlights of oncoming vehicles back towards the vehicles, enabling the driver to clearly see the retroreflector device. The angle between the light from the headlights of the car and a normal of the surface on which the retroreflector surfaces(s) is above the threshold.

Figure 1:
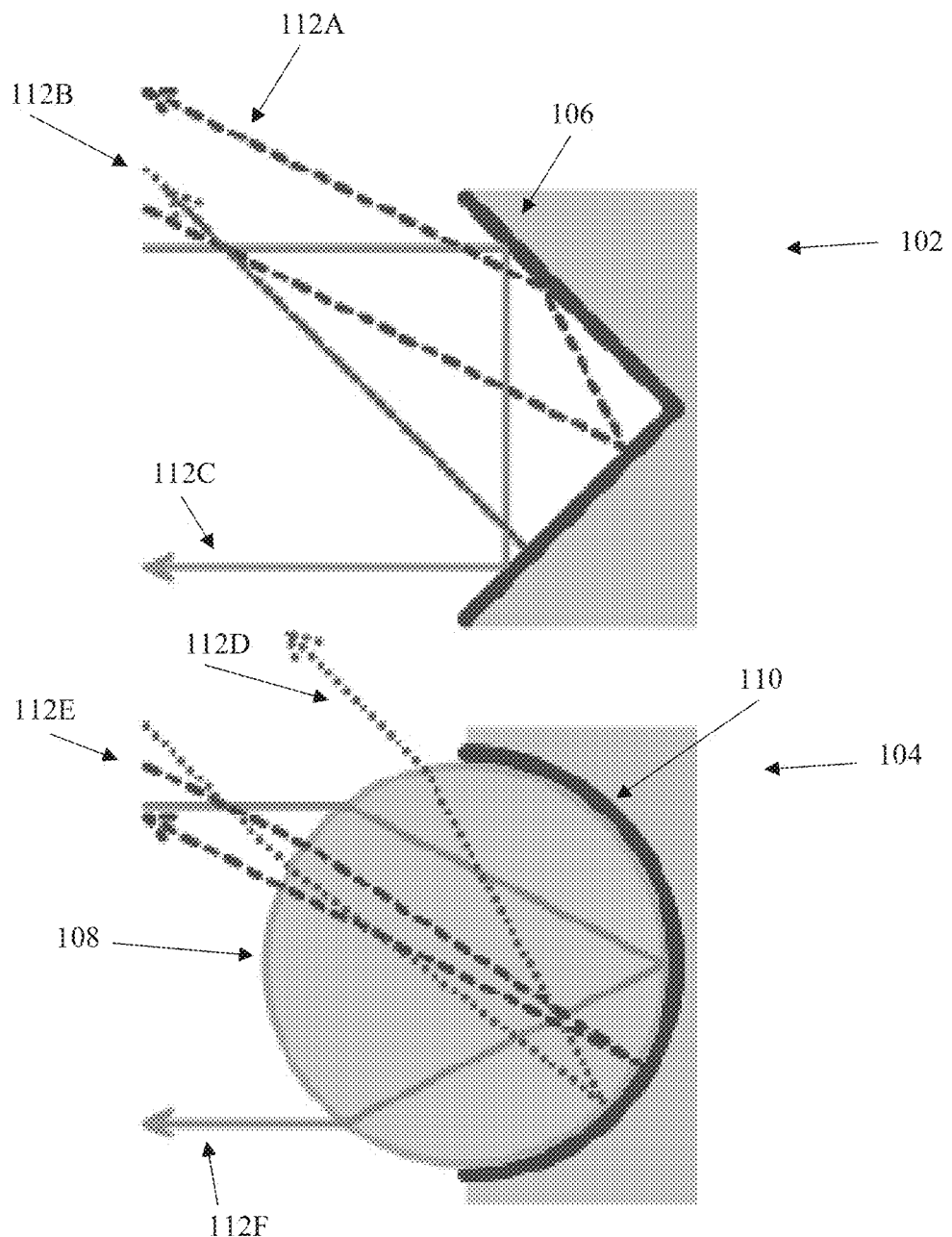
FIG. 1 is a schematic depicting a prism based retroreflective surface, and a sphere-based retroreflector, to help understand some embodiments of the present invention.

For purposes of better understanding some embodiments of the present invention, as illustrated in FIGS. 3-13 of the drawings, reference is first made to the construction of standard retroreflective surfaces/coatings as illustrated in FIG. 1.

Reference is now made to FIG. 1, which is a schematic depicting a prism based retroreflective surface 102, and a sphere-based retroreflector 104, to help understand some embodiments of the present invention.

Retroreflective surface 102 depicts a single reflective prism on a substrate 106 forming a surface. Each prism may be small, on the order of about 10-100 micrometers. The small size of the prism enables a high density of prisms, for example, for making a set of such prisms into a thin tape/flexible strip substrate 106 that can be attached to other objects. For example, such a tape can be applied to different surfaces of objects that should be visible at night, such as life jackets, cars, and street signs. In another example, the high density of prisms may be applied to roads.

Retroreflective surface 104 depicts a single small transparent sphere 108 on a binding surface 110. The backside of sphere 108 may be coated and/or in contact with a reflective surface to maximize light specular and/or diffuse reflection. The size of the spheres is typically 100-1000 microns for applications to roads/pavements. A large number of the spheres are placed on a substrate to form the retroreflective surface. For example, glass spheres on a white road marking paint, or spheres where half of each sphere is coated with aluminum.

Since the standard retroreflective surfaces are based on a small reflective surface that is used to reflect light back to the source with minimal scattering, Snell's law applies. In air, the angle of incidence is equal to the angle of reflection. In glass, the angle of reflection is slightly changed from the angle of incidence according to the index of refraction. In order to reflect the light back to the source, scattering of the reflection needs to be reduced. As noted for light rays 112A-E, including incident and reflection rays, the light is reflected back to the source for small angles of incidence. For larger angles of incidence the light reflected by the surface of the standard retroreflector is reflected to different directions and part of it is reflected diffusely.

Figure 2:
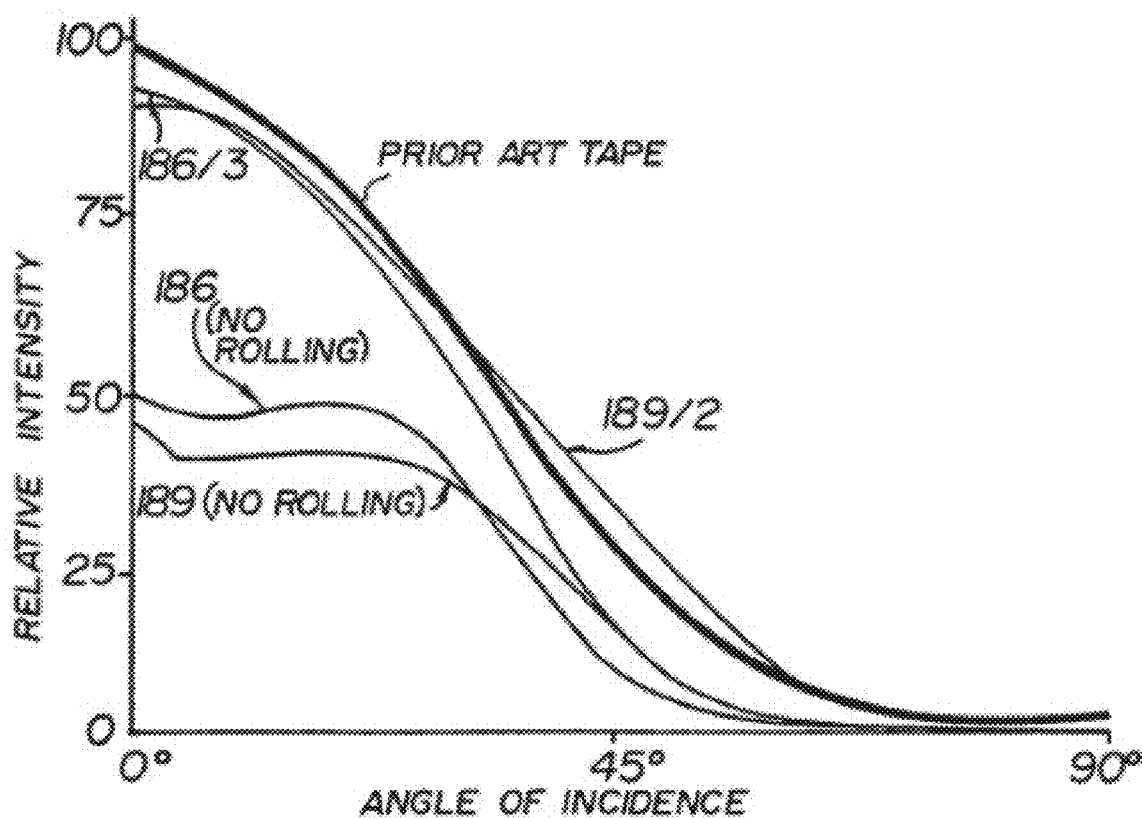
FIG. 2 is an example of a graph depicting relative intensity of light reflected by different prism and sphere based retroreflector tapes as a function of angle of incidence, to help understand some embodiments of the present invention.

Reference is now made to FIG. 2, which is an example of a graph 202 depicting relative intensity of light reflected by different standard retroreflector tapes as a function of angle of incidence, to help understand some embodiments of the present invention. As seen in graph 202, as the angle of incidence increases, the relative intensity drops. Above about 45 degrees the relative intensity is below about 25%, which renders the standard retroreflector inoperable. For example, standard tape based retroreflective surfaces applied to a flat road do not reflect light well to cars, since the angle of incidence is greater than 45 degrees when the car is at a distance of over a few meters from the tape. Sphere based retroreflectors do a little better At least some embodiments described herein address the technical problem of improving prior retroreflectors, and/or improving the technology of retroreflectors. The technical problem and/or improvement relate to prismatic retroreflective tapes (e.g., as described with reference to 102 of FIG. 1) experiencing reduction in reflection intensity with increasing incidence angles, for example, as described with reference to FIG. 2. The prismatic retroreflective tapes are limited to angles of incidence of about 0-50 degrees, or less. In contrast, at least some embodiments described herein, where the retroreflective surface and the incident object are designed, optionally as a combination, to generate the refracted ray for hitting the retroreflective surface at an angle of incidence below a threshold (above which the retroreflector surface ceases to effectively return electromagnetic energy substantially along the same path of the incident ray towards the illumination source), reflect incident rays back towards the illumination source even at high angles of incidence. High angles of incidence include, for example, about 40-89, or about 50-80, or about 55-89, or about 60-80, or less than about 50, 60, 70, or 80 degrees. High reflection intensity at large incident angles enables, for example, placing the retroreflector device described herein on a flat surface, and directing the illumination source towards the retroreflector device close to the flat surface. Standard retroreflectors do not reflect sufficient light in such scenarios. For example, on the street, cat eye reflectors are elevated at an angle above the road to ensure reflections back to drivers of cars whose headlights are generating the source of illumination, and are aligned to minimize the angle of incidence of incoming car headlights Such cat eye reflectors interfere with the driving when the wheels of the car hit them, and are complex to install. Retroreflector devices as described herein provide efficient reflection of light to the cars even when placed flat on the road, for example, by having tiny spheres or similar incident object shapes glued to the road or partially immersed in road paint. The flat design helps prevent interference with the wheels of the car and is simple to install.

At least some embodiments described herein address the technical problem of improving prior retroreflectors, and/or improving the technology of retroreflectors. The technical problem and/or improvement relate to the requirement of sphere based retroreflective coatings (e.g., as described with reference to 104 of FIG. 1) to be perfect spheres in order to operate efficiently. The larger deviation of the globules from perfect spheres and/or the larger the deviation from a perfectly uniform material and/or coating, the lesser the reflection intensity and/or the wider the reflection angle. In contrast, at least some embodiments described herein, where the retroreflective surface and the incident object are designed, optionally as a combination, to generate the refracted ray for hitting the retroreflective surface at an angle of incidence below a threshold (above which the retroreflector surface ceases to effectively return electromagnetic energy substantially along the same path of the incident ray towards the illumination source), enable using incident objects with imperfect surfaces and/or non-spherical surfaces, i.e., not dependent on the precise shape, to reflect the incident electromagnetic energy back towards the source. Even highly non-spherical shapes may be used to reflect the electromagnetic energy efficiently back towards its source.

At least some embodiments described herein address the technical problem of improving prior retroreflectors, and/or improving the technology of retroreflectors. Existing retroreflectors are not effective when placed flat on certain surfaces. For example, placing existing retroreflectors flat on a road (e.g., to indicate lanes) are not effective, since the angle of incidence of headlights from the car hitting the retroreflector is too large for the retroreflector to reflect the headlights back to the car. Existing solutions such as cat eye reflectors are not effective, since such solutions elevate the retroreflectors high off the ground such that they interfere with vehicle traffic. Moreover, the cat eye reflector is in the shape of a 'bump', i.e., non-flat. A car driving over a cat eye reflector experiences uncomfortable bumps. Moreover, such cat eye retroreflectors are complex and/or expensive to manufacture and/or position. At least some embodiments described herein provide a retroreflector device where retroreflector surface(s) are positioned at an angle relative to a surface of a substrate. The angle between the retroreflector surfaces and the surface of the substrate enables incidence rays (e.g., headlights from a car) to hit the retroreflective surface at an angle of incidence at which the retroreflective surface is efficient at reflecting the reflected ray back towards the source of the incident ray. The height of the retroreflector device described herein is sufficiently low (e.g., less than about 10 mm, or 6 mm, or 5 mm, or 3 mm, or other values) and/or sufficiently flat, to enable placing retroreflector devices anywhere on the road, even where vehicles driver over them, without interfering with motion of the vehicle, i.e., passengers in the vehicle do not notice a bump or do not notice a significant bump. The low height is maintained by placing multiple retroreflector elements, for example, in parallel, along the surface of the substrate, which may provide a reflective surface along most or the entire substrate, which may be similar to the reflective surface provided with a cat eye reflector without the height of the cat eye reflector.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 3:
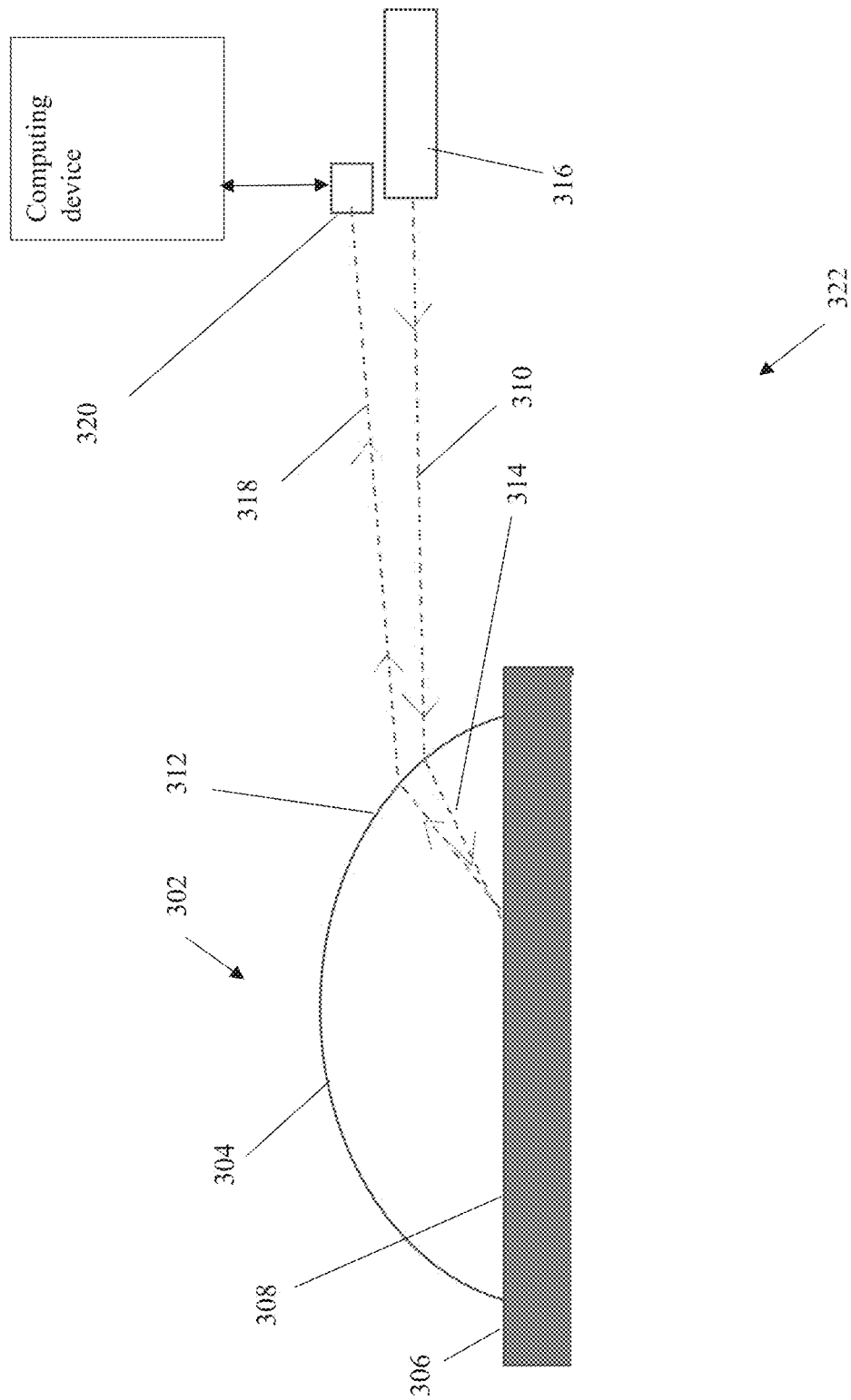
FIG. 3 is a schematic of a retroreflector device designed to reflect incident light back towards a source of illumination at angles of incidence above a threshold, in accordance with some embodiments of the present invention.

Reference is now made to FIG. 3, which is a schematic of a retroreflector device 302 designed to reflect incident light back towards a source of illumination at angles of incidence below a high threshold, in accordance with some embodiments of the present invention. The high threshold of the angles of incidence at which retroreflective device 302 efficiently returns light back towards its source of illumination may be up to, for example, 90 degrees, or 85, or 80, or 75, or 70, or 65, or 60, or 55, or 50, or other intermediate values. It is noted that in contrast, traditional prism retroreflectors do not return light efficiently for angles of incidence above about 40, or 45, or 50 degrees, as described herein.

Retroreflector device 302 includes an incident object 304 and a retroreflective surface 306. Incident object 304 is made of a material transparent to electromagnetic radiation, for example, glass and/or plastic. Electromagnetic radiation may include, for example, one or more bands of the visible light spectrum (e.g., corresponding to colors), ultraviolet (UV), infrared (IR), near infrared (NIR), and short wave infrared (SWIR). Retroreflective surface 306 is made of a retroreflective material, for example, based on prisms and/or small spheres, for example, as described with reference to FIG. 1. Retroreflective surface 306 is attached (e.g., glued, clamped, painted thereon, injection molded to) to a back surface 308 of incident object 304. Retroreflective surface 306 is placed in direct contact with the back surface 308, without an air gap between retroreflective surface 306 and back surface 308. Retroreflective surface 306 may be external to back surface 308, for example, in contact with back surface 308, and/or located in near proximity to back surface 308. Retroreflective surface 306 may be located within incident object 304, for example, incident object 304 includes a hollow interior and retroreflective surface 306 is positioned within the hollow interior. Retroreflective surface 306 may be integrated with incident object 304, for example, retroreflective surface 306 is injection molded with retroreflective surface 306 within the mold. Incident object 304 may be made of a resilient material (e.g., glass, plastic) designed to protect retroreflective surface 306 from damage from an external environment, for example, wind, hail, rain, vehicles and pedestrians.

A size dimension (e.g., diameter, length) of incident object 304 may be larger than an individual reflective prism, for example, by at least about 5, 10, 50, 100 times, or other intermediate or larger value. For example, a length of each individual reflective prism is about 10-100, or about 100-1000, micrometers, and a length of the incident object is at least about 1, 10, 50 millimeters, or other values.

Incident object 304 is designed to refract an incident ray 310 hitting an incident surface 312 of incident object 304, to generate a refracted ray 314 that hits back surface 308. Incident surface 312 may include a portion thereof (or may be entirely) shaped substantially as a surface of a sphere. An angle of incidence of incident ray 310 is about 90 degrees when hitting the surface of the sphere. Incident ray 310 is generated by an illumination source 316 that generates electromagnetic radiation, for example, a flashlight at the visible light spectrum, a flash, and illumination sources designed to generate electromagnetic energy at other frequencies, such as UV, IR, NIR, and SWIR. Retroreflective surface 312 and/or incident object 304 and/or position of retroreflective surface 306 are designed to refract incident ray 310 to generate refracted ray 314 for hitting retroreflective surface 306 at an angle of incidence below a threshold, above which the retroreflector surface ceases to effectively return electromagnetic energy substantially along the same path of the incident ray towards the illumination source. It is noted that the threshold is not necessarily a selection but rather a limitation inherent to the principle of operation of the retroreflective surface. The threshold may be, for example, about 40, or 45, or 45 degrees, or other smaller, intermediate, or larger values. The threshold may be defined as the maximal incidence angle at which at least a percentage of intensity of the illumination source is reflected back under certain conditions (e.g., sunlight, cloudy, night) for a certain distance, for example, returning at least about 1%, or 5%, or 10%, or other amount to a distance of about 50 meters, or 100 meters, or other distance. The design of retroreflector 302 is for refracted ray 314 to hit retroreflective surface 306 at the angle of incidence below the threshold for a range of angles of incidence of incident ray 310, including angles of incidence which are large, for example, above about 40, or 45, or 50, or greater angles, and/or ranges of about 40-90, or 50-90, or other ranges. For example, for an angle of incidence of 70 degrees of incident ray 310 (when hitting incident surface 312), refracted ray 314 hits retroreflective surface 306 at 30 degrees (i.e., below the threshold of 40 degrees), thereby causing the electromagnetic radiation to be reflected back towards its source. Retroreflective surface 306 is optically designed to efficiently reflect refracted ray 314 (which hits retroreflective surface 306 at the angle of incidence below the threshold) substantially along a same optical path 318 as incident ray 310 and refracted ray 314, back towards illumination source 316. A sensor 320, for example, a still camera, a video camera, a visible light sensors (e.g., CMOS, CCD), a UV sensor, an IR sensor, a NIR sensor, and a SWIR sensor, may capture the reflected light for generating one or more images.

Retroreflector device 302 may include a single incident object 304, which may be sized to be sufficiently large for detection by sensor 320 and/or visually by a human, for example, having a dimension of at least about 5, 10, 50, 100 millimeters, or other values. Alternatively or additionally, Retroreflector device 302 may include multiple incident objects 304 each in association with a respective retroreflective surface (e.g., adhered to a respective back surface of each incident object). The multiple incident objects 304 and associated retroreflective surfaces may be positioned over another object, for example, spread along a surface of the earth. Each incident object 304 may be sized to be small and/or non-visible on its own from a distance where the sensor is located, where the multiple incident objects 304 are visible when close together. For example, each incident object 304 is less than about 10, 5, 1 millimeters, or other values.

Optionally, a system 322 includes one or more of the following components:

Retroreflector device 302, as described herein.
Retroreflector device 1402, as described herein with reference to FIG. 14.
Retroreflector device 602, as described herein with reference to FIG. 6.
Other retroreflective devices, as described herein, for example, with reference to the Examples section.
Illumination source(s) 316, as described herein. Illumination source 316 may be controlled to generate a selected pattern of illumination, for example, continuous, alternating on and off at equal intervals (e.g., strobe), Morse coding, and the like.
Sensor(s) 320, as described herein.
Computing device(s) 324, which may be in communication with sensor(s) 320 and/or illumination source 316. Computing device may control illumination source 316, and/or may receive one or more images captured by sensor 320. Computing device 324 may analyze the image(s) for detecting the presence of retroreflector device depicted within the image, and/or computing a location of the retroreflector device according to the image. Computing device 324 may include one or more of the following components: processor(s), memory, data storage device, user interface (e.g., for input and/or output, such as display, touch screen, keyboard, mouse), and/or network interface for connecting to a network. Computing device 324 may be implemented as, for example, a client terminal, a smart phone, a server, a virtual device, a group of connected devices, and the like.

Incident surface 312 may be located behind a barrier made out of a material selected for being opaque to visible light and/or non-opaque to NIR and/or SWIR, for example, paint and/or another object. Such design enables detecting retroreflector device 302 using a NIR and/or SWIR sensor that senses reflection from a NIR and/or SWIR illumination element, without retroreflector device 302 being visually detectable, for example, as described with reference to U.S. Pat. No. 10,867,492, by at least one common inventor as the present application, and assigned to the same assignee, incorporated herein by reference in its entirety.

Figure 4:
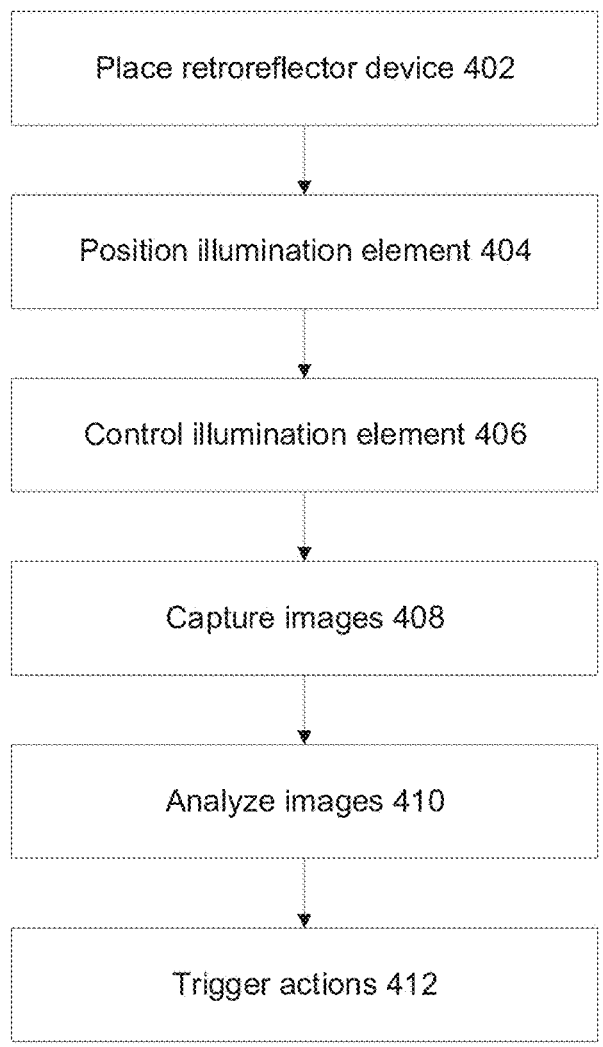
FIG. 4 is a flowchart of an exemplary method of operation using a retroreflector device, in accordance with some embodiments of the present invention.

Reference is now made to FIG. 4, which is a flowchart of an exemplary method of operation using a retroreflector device, in accordance with some embodiments of the present invention. The method may be for operation of exemplary components as described herein, for example, with reference to FIG. 3 and/or FIG. 14.

At 402, the retroreflector device is placed. One or more retroreflector devices may be placed, for example, on the earth, road, landing pad, and/or other objects, such as to mark the location of the object. Retroreflector may be, for example, retroreflector 302 as described with reference to FIG. 3 and/or retroreflector 1402 as described with reference to FIG. 14.

Optionally, the retroreflector device may be replaced with, or be part of, an optical marker optical marker that includes a predefined reflective surface relative to a background. The predefined reflective surface may be arranged in a defined pattern, for example, alternating lines, dots, or other shapes of reflective surface and background. For example, the retroreflector device may be replaced with any optical marker that includes the predefined reflective surface, for example, a standard retroreflective surface on a black substrate, light colored paint on a dark surface, and a mirror on a non-mirror surface.

At 404, the illumination element that generates illumination at an electromagnetic frequency and/or range is positioned. The illumination element may be positioned to direct the electromagnetic radiation as incident rays at high incident angles to the incident surface of the incident object of the retroreflector device. For example, at incident angles of up to about 50-90 degrees, or up to about 60, or 70, or 80 degrees, or other values. The retroreflector device may be positioned in parallel to a surface of an earth, and an angle formed by the illumination element, the retroreflector device, and the surface of the earth forms the high incident angle. For example, the retroreflector device is painted onto roads, and the illumination element is headlights of a car.

At 406, the illumination element is controlled to apply a selected illumination pattern, optionally a time-modulated pattern, for example, continuous, strobe, Morse code, and the like.

At 408, a sensor captures one or more images at the illumination frequencies, optionally a sequence of images over a time interval.

At 410, a processor analyzes the image(s) for detecting a presence of the retroreflector device and/or position of the retroreflector device according to detection of the illumination pattern reflected back from the retroreflector device.

The processor may analyze the sequential images to detect the presence of the optical marker by extracting a time-modulated pattern relative to a background of the sequential images correlated with the time modulated electromagnetic illumination pattern. For example, when the illumination pattern is a strobe light that turns on and off every second, and the optical marker includes parallel lines of a light color alternating with lines of a dark color, the processor analyzes the images to detect a pattern of alternating light and dark colored lines that appears and disappears in a time pattern correlated with the time-modulated illumination pattern to identify the optical marker.

At 412, one or more actions may be triggered in response to the analysis. For example, the sensor and/or illumination element may be installed on a vehicle. The vehicle may automatically navigate according to the detected location, and/or vehicle systems may automatically be triggered accordingly, such as to automatically break. In another example, the sensor and/or illumination element may be installed on a drone. The drone may automatically navigate and/or land accordingly.

Figure 5:
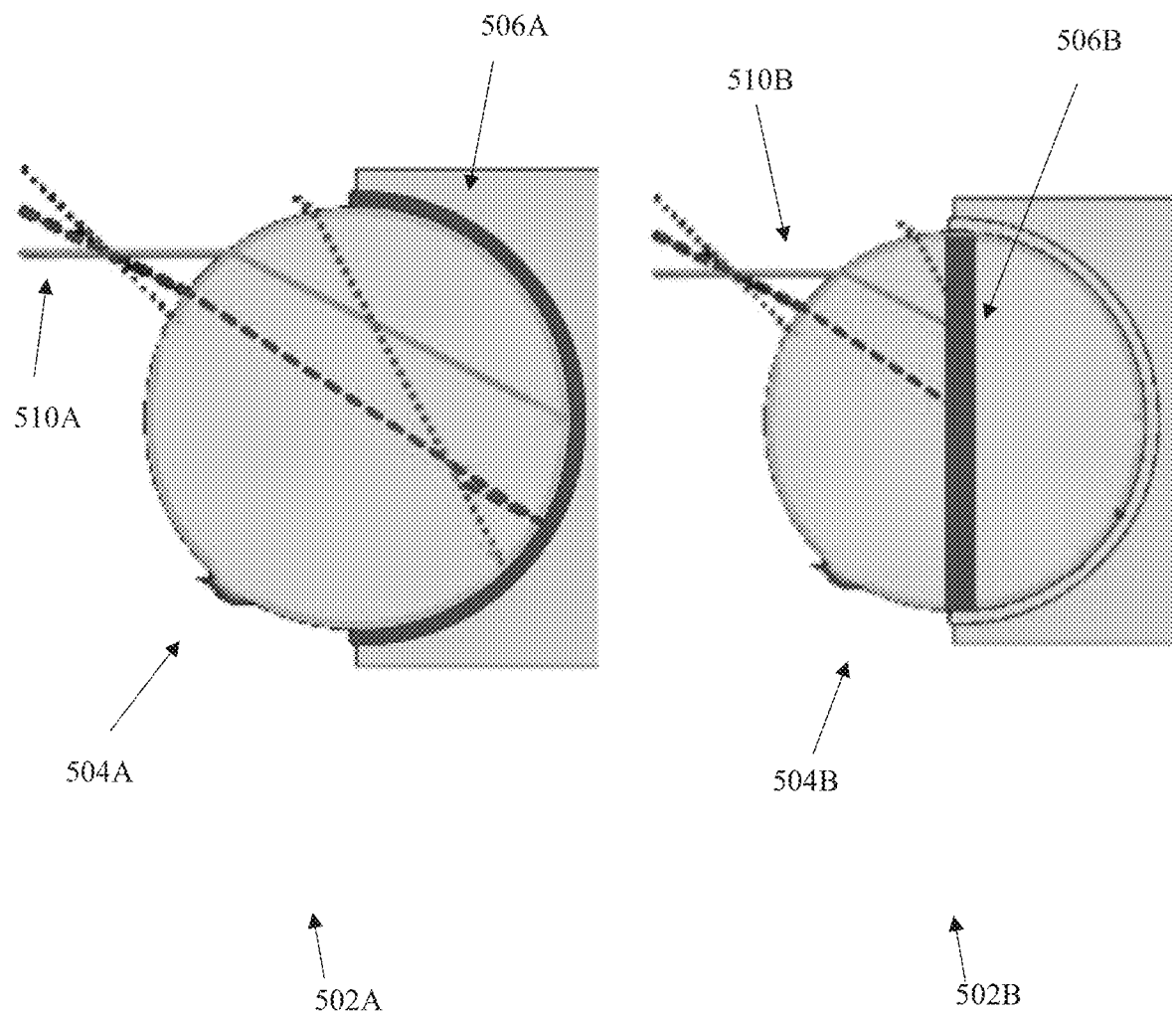
FIG. 5 is a schematic of exemplary embodiments of retroreflector devices, in accordance with some embodiments of the present invention.

Reference is now made to FIG. 5, which is a schematic of exemplary embodiments of retroreflector device 502A and 502B, in accordance with some embodiments of the present invention. Embodiments of retroreflector devices 502A-B are based on retroreflector device 302 of FIG. 3.

Retroreflector device 502A includes incident object 504A shaped substantially as a sphere. Retroreflective surface 506A is positioned across approximately the surface of the lower half of the sphere.

Retroreflector device 502B includes incident object 504B shaped substantially as a half-sphere with substantially flat bottom. Retroreflective surface 506B is positioned across approximately the flat bottom.

In both retroreflector devices 502A-B, incident rays 510A-B from an illumination source are reflected in substantially in the same direction back towards the source, as described herein.

Figure 6:
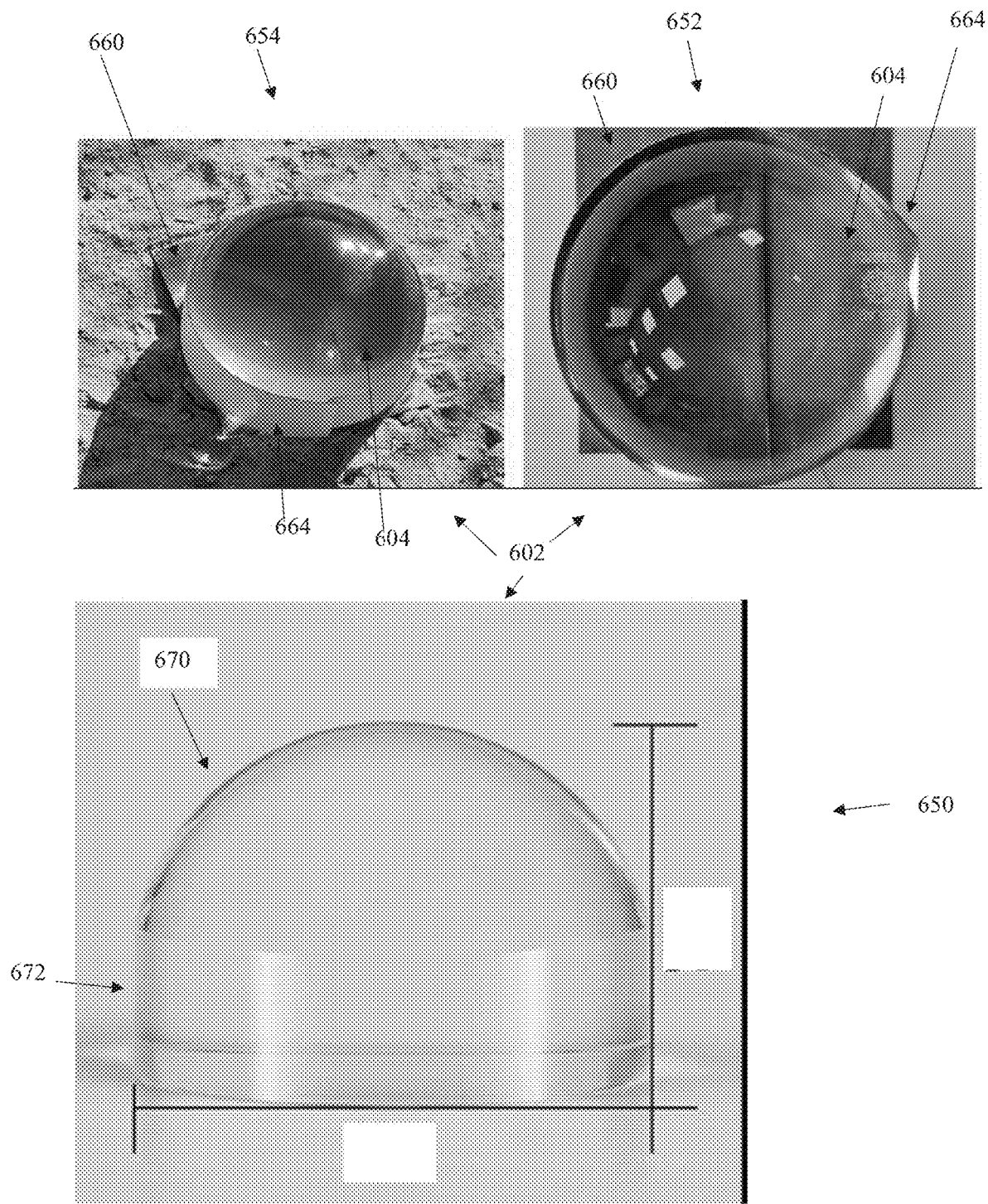
FIG. 6 is a schematic of another exemplary embodiment of a retroreflector device, in accordance with some embodiments of the present invention.

Reference is now made to FIG. 6, which is a schematic of another exemplary embodiment of a retroreflector device 602, in accordance with some embodiments of the present invention. Retroreflector device 602 is based on retroreflector device 302 of FIG. 3.

Schematic 650 is a side view of an incident object 604 of retroreflector device 602 without any retroreflective surface to help visualize the shape of incident object 604. Incident object 604 is formed of two components. A first component 670 is shaped approximately as a half sphere with substantially flat bottom. A second component 672 is shaped approximately as a cylinder band with substantially parallel walls and/or internal diameter, or may have a slight angle from to bottom such as a slight taper.

Schematic 652 is a top view of retroreflector device 602, and schematic 654 is an isometric view of retroreflector device 602, including a retroreflective surface, as during use. Retroreflective surface includes a first portion 660 covering a substantially flat bottom of second component 672 of incident object 604, and a second portion 664 arranged as a band covering the surface of the cylinder of second component 672.

Standard retroreflective surfaces such as tape (e.g., prismatic or microsphere based) provides low retro-reflection for angles of incidence >40 degrees. Hence placing the retroreflective surface just at the bottom of a half-sphere or in the middle of a sphere, such as first portion 660 and/or as described with reference to FIG. 5, may not necessarily provide sufficient reflection for large angles of incidence, in particular when the size (e.g., diameter) of the incidence object is larger (e.g., greater than about 5, or 10, or 50, or 80 millimeters), since the refracted rays hit the flat tape at angles that are too high to enable reflection back in the same direction by the retroreflective surface. Second component 672 is designed to intercept the electromagnetic rays refracted by the incident surface at angles that are less than the threshold of incident angles at which the retroreflector surface efficiently returns light, which reflects the electromagnetic rays back in the same direction.

Reference is now made to FIG. 14, which is a schematic of an exemplary retroreflector device 1402 designed to reflect incident electromagnetic illumination (e.g., light, NIR, SWIR) 1404 back towards a source of illumination 1406 for incident electromagnetic radiation at an angle of incidence 1408 relative to a normal 1410 of a surface 1412 of retroreflector device 1402 above a threshold, in accordance with some embodiments of the present invention.

Retroreflector device 1402 includes a substrate 1414 with a surface, optionally a binding surface. One or more retroreflective surfaces 1416 are positioned at an angle 1418 relative to surface 1412 of substrate 1414. Multiple retroreflective surfaces 1416 are positioned along substrate 1414, optionally in parallel. Most of surface 1412 or all of surface 1412 may be covered with retroreflectors, providing for a total reflective area that is about the area of surface 1412. Substrate 1414 may be, for example, plastic, wood, metal, and the like.

For clarity, electromagnetic illumination is shown from source 1406 to two of the retroreflector surfaces 1416, but it is to be understood that there may be more than three retroreflector surfaces 1416 (e.g., 5, 10, 100, or more), and that the illumination reaches most or all of the retroreflector surfaces 1416.

Retroreflective surfaces 1416, which may be made of flexible material may be positioned on support elements 1420, which may be made of rigid material to provide support for the retroreflective surfaces. There may be a large number and/or density of retroreflective surfaces 1416 on substrate 1414, for example, to provide a sufficiently large reflective surface that is visible from a distance, such as to a driver of a vehicle located tens of meters away. Retroreflective surface 1416 may be, for example, based on existing prism designs (e.g., as tape), and/or small spheres (e.g., bound to support elements 1420), as described herein.

Angle 1418 between retroreflective surface 1416 and substrate 1414 is selected for incident ray 1404 to hit retroreflective surface(s) 1416 at an angle of incidence 1422 below a threshold. The threshold for angle of incidence 1422 between incident ray 1404 and reflective surface 1416 is to be low enough such that retroreflective surface 1416 generates a reflected ray 1424 back towards the source that generated the incident ray, as described herein. Proper selection of angle 1418 enables retroreflector device 1402 to reflect incident electromagnetic energy 1404 back to source 1406 as reflected electromagnetic energy 1424 when angle 1408 between incident ray 1404 and normal 1410 of the surface 1412 is above the threshold. For example, when angle 1408 is expected to be up to about 80 degree (e.g., car headlights almost parallel to the ground), angle 1418 may be set at about 30 degrees or greater, such that incident ray 1404 hits retroreflector surface 1416 at an angle of incidence that is low enough (e.g., below about 50, or 45 or 40 degrees) for retroreflector surface 1416 to efficiency reflect the electromagnetic energy 1424 back towards source 1406.

A height 1426 of retroreflector device 1402, i.e., from a bottom of substrate 1414 to a top of retroreflective surface(s) 1416 and/or top of a coating 1428 and/or coating 1430 and/or top is less than about 10 millimeters (mm), or 7 mm, or 5 mm, or 4 mm, or 3 mm, or other values. For example, height 1426 of less than about 4 mm enables placing retroreflector device 1402 on a surface of a road without risk of interfering with movement of vehicles. For comparison, road mark paint thickness is typically about 3 mm or less.

Retroreflector device 1402 may include protective transparent coating 1430, which overlays the retroreflective surface(s) 1416 and surface 1412, for example, applied as a layer of epoxy and/or plastic that also fills the spaces between retroreflective surfaces 1416. Protective transparent coating 1430 may be made of a resilient material selected to withstand pressure applied by vehicles driving over the retroreflector device 1402, for example, epoxy and/or plastic. Coating 1430 is designed to be transparent to the desired electromagnetic radiation which is to be reflected by retroreflective surfaces 1416.

Retroreflector device 1402 may include coating 1428 that is substantially opaque to electromagnetic energy in the visible range and substantially transparent to electromagnetic energy in the near infrared range. This enables camouflaging or "hiding" retroreflector device 1402 during daylight and/or making retroreflector device 1402 invisible to artificial light such as headlights and/or street lamps, and to enable visualizing retroreflector device 1402 under NIR illumination. Coating 1428 may be colored similarly to a color of a background surface on which the retroreflector device 1402 is placed. For example, on a black asphalt road, coating 1428 may appear black under sunlight and/or headlights and/or street lamps, while brightly reflecting NIR illumination. Coating 1428 may be applied as an additional coating over coating 1430 (e.g., as a paint) and/or coating 1428 and coating 1430 may be integrated into a single coating that provides both functions of coatings 1428 and 1430.

It is expected that during the life of a patent maturing from this application many relevant retroreflector devices will be developed and the scope of the term retroreflector device is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Figure 7:
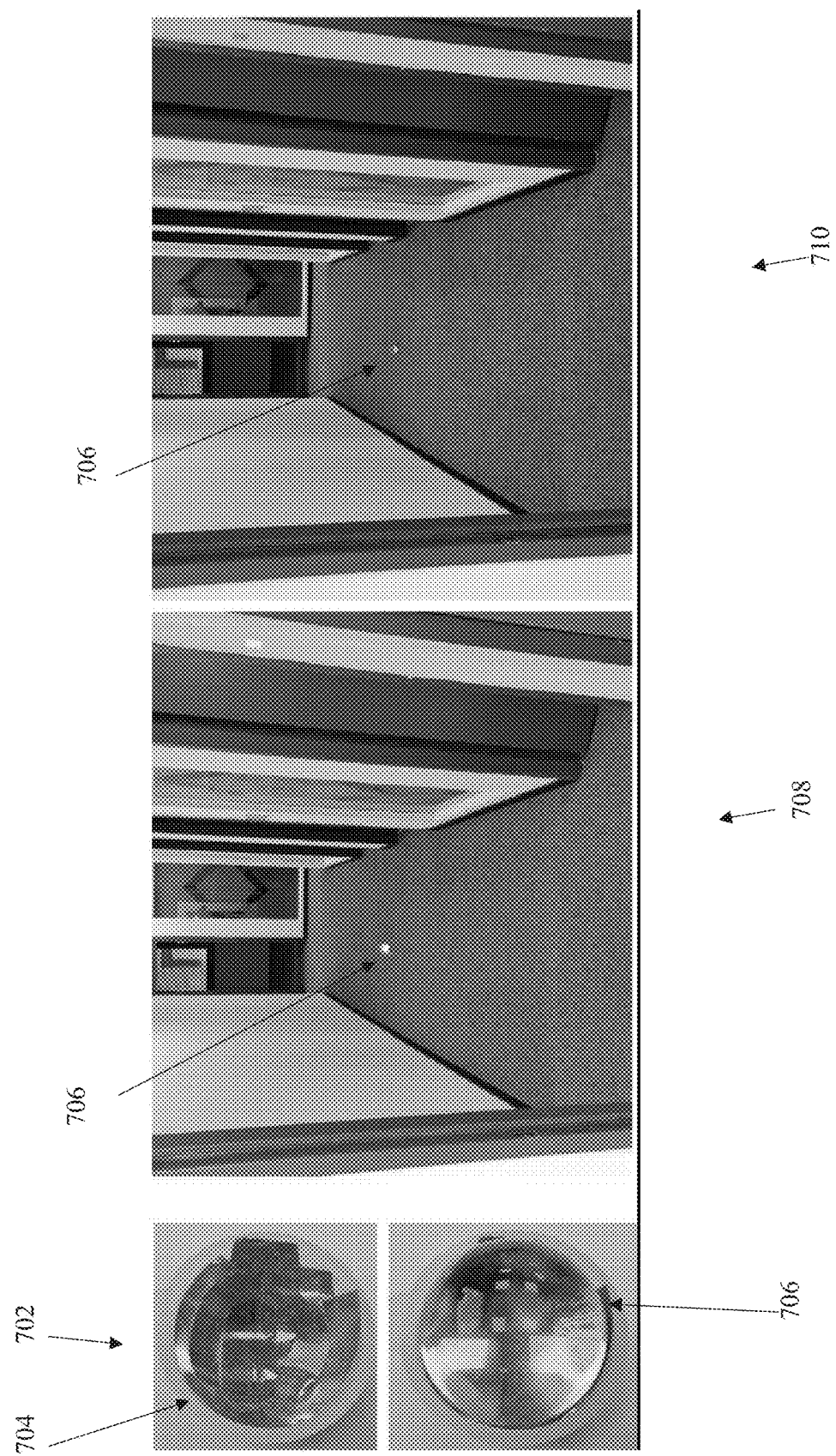
FIG. 7 is a schematic depicting an experiment performed by Inventors, in accordance with some embodiments of the present invention.

Reference is now made to FIG. 7, which is a schematic depicting an experiment performed by Inventors, in accordance with some embodiments of the present invention.

Schematic 702 depicts a retroreflector 704 including an incident object shaped as a half-sphere shell and retroreflective tape, which was assembled by Inventors, based on at least one embodiment described herein, for example, based on retroreflector 302 described with reference to FIG. 3. The incident object was made of plastic. The retroreflective tape was strips of prismatic retroreflector tape. Retroreflector 706 was assembled by placing a glass sphere on top of retroreflector 704.

Schematic 708 depicts retroreflector 706 in an office hallway, illuminated with a co-collimated light source. As seen, retroreflector 706 in schematic 708 is bright. In contrast, schematic 710 depicts retroreflector 706 at the same location, without the illumination. As seen, retroreflector 706 in schematic 708 is dim, and difficult to see. This experiment illustrates the efficiency of retroreflector 706, assembled based on based on at least one embodiment described herein, in returning the illumination light back towards its source.

Figure 8:
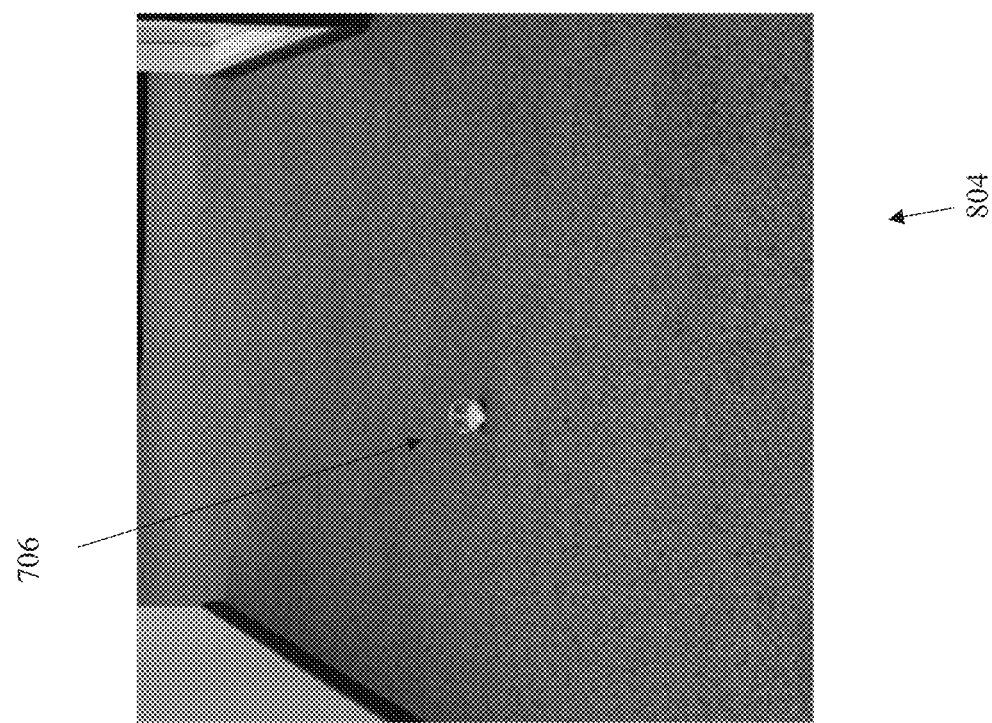
FIG. 8 is a schematic that includes a magnification of the retroreflector in the office hallway under illumination as depicted in FIG. 7, and a schematic that includes a magnification of the retroreflector in the office hallway without the illumination as depicted in FIG. 7, in accordance with some embodiments of the present invention.
Figure 8:
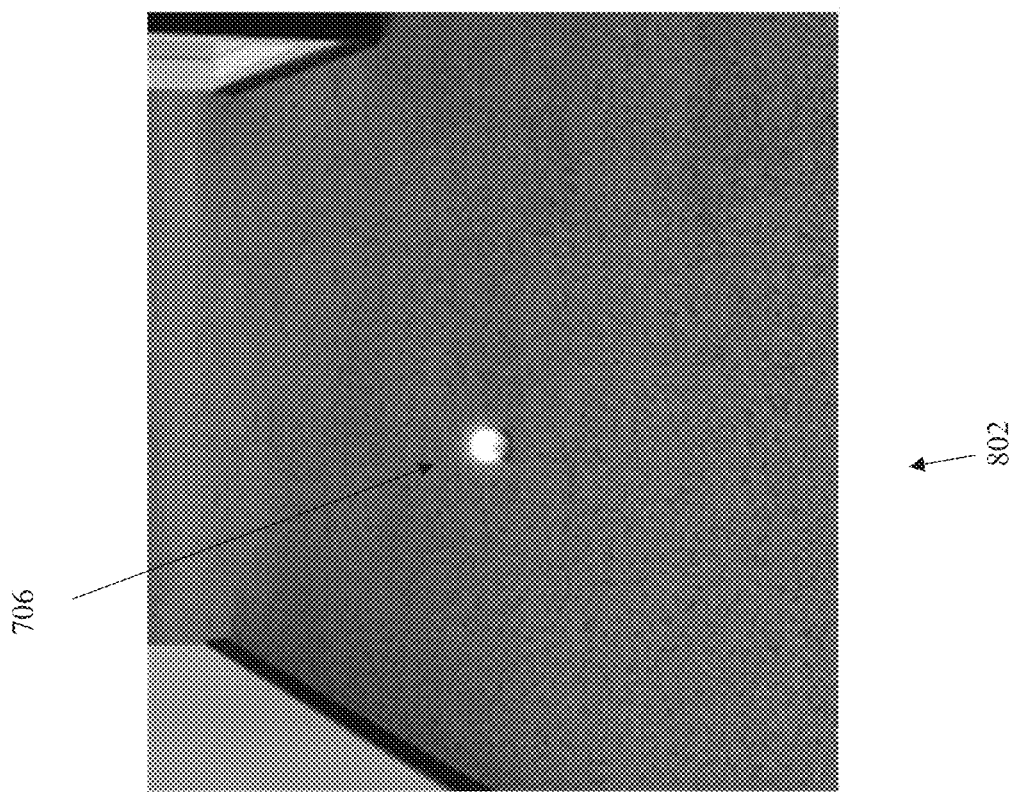

Reference is now made to FIG. 8, which is a schematic 802 that includes a magnification of retroreflector 706 in the office hallway under illumination as depicted in schematic 708 of FIG. 7, and a schematic 804 that includes a magnification of retroreflector 706 in the office hallway without the illumination as depicted in schematic 710 of FIG. 7, in accordance with some embodiments of the present invention.

The illumination in schematic 802 was provided by a flash of a smartphone activated for capturing the image. In schematic 804, no flash was activated during capture of the image. For both schematics 802 and 804, background illumination was provided by ambient light. The images were captured by the camera of the smartphone at a distance of about 10 meters away from retroreflector 706, at an angle of incidence greater than 60 degrees, i.e., high angles of incidence. This experiment illustrates the efficiency of retroreflector 706, assembled based on based on at least one embodiment described herein, in returning the illumination light back towards its source at a high angle of incidence greater than 60 degrees to a distance of about 10 meters, which cannot be obtained using standard devices as described herein.

Reference is now made to FIG. 9, which depicts another experiment performed by Inventors, in accordance with some embodiments of the present invention. Four retroreflective devices 902A-D were assembled by Inventors, based on at least one embodiment described herein, for example, based on retroreflector 302 described with reference to FIG. 3. Each retroreflective device 902A-D includes a half sphere shaped incident object with NIR and/or SWIR transparent and visible spectrum (VIS) blocking pigment applied. Each retroreflective device 902A and 902B has a white diffuse background on the back of the half sphere, for serving as a control. Each retroreflective device 902C and 902D includes a retroreflective planar surface, in accordance with some embodiments, for evaluation thereof. Schematics 904 and 906 are two VIS photos in two ambient light situations.

Reference is now made to FIG. 10, which includes schematics 1002, 1004, 1006, and 1008, depicting retroreflective devices 902A-D of FIG. 9 under different environmental conditions, in accordance with some embodiments of the present invention. Schematics 1002 and 1004 are captured at a distance of about 15 meters, at an angle of incidence greater than 50 degrees, using a NIR and/or SWIR flashlight as a co-collimated source to NIR and/or SWIR sensitive RGB camera (no NIR and/or SWIR cut filter). Schematic 1002 is captured with the illumination flashlight on. Schematic 1004 is captured with the illumination flashlight off. Schematic 1006 is a zoom-in of the retroreflective devices of schematic 1002. Schematic 1008 is a zoom-in of the retroreflective devices of schematic 1004. Retroreflective devices 902C-D with the retroreflective planar surface are clearly visible and provide strong reflective illumination in schematic 1006, and even in schematic 1002. Retroreflective devices 902C-D with the retroreflective planar surface are still visible in schematic 1004, and visible albeit with difficulty even in schematic 1004. In contrast, retroreflective devices 902A-B with the white diffuse background are not visible in any of schematics 1002, 1004, 1006, and 1008.

Reference is now made to FIG. 11, which includes schematics 1102 and 1104 depicting retroreflective devices 902A-D of FIG. 9 under different environmental conditions, in accordance with some embodiments of the present invention. Schematics 1102 and 1104 are both captured up close, with a NIR and/or SWIR camera under a 850 nm NIR and/or SWIR flashlight in a dark room. Schematic 1102 is captured at an angle of incidence of about 0 degrees. Schematic 1104 is captured at an angle of incidence of about 45 degrees. Schematics 1102 and 1104 indicates that retroreflective devices 902C-D with the retroreflective planar surface are clearly visible and provide strong reflective illumination under NIR and/or SWIR illumination at different angles of incidence. In contrast, retroreflective devices 902A-B with the white diffuse background appear dark.

Reference is now made to FIG. 12, which includes schematics 1202 and 1204 depicting a retroreflective device 602 as described with reference to FIG. 6, in accordance with some embodiments of the present invention. Schematics 1202 and 1204 depict retroreflective device 602 captured by a camera located about 70 meters away, at broad daylight (i.e., direct sunlight on surface of the earth). The camera is of a S20 smartphone using 30× zoom. Schematic 1202 is captured under a 1.5 watt white LED flashlight illumination. Schematic 1204 is captured while the flashlight is off. The reflection of the illumination source by retroreflective device 602 is depicted in schematic 1202, from far, under broad daylight, using a weak illumination source. The location of retroreflective device 602 may be detected, for example, by analyzing images to identify a pattern of the illumination, for example, a strobe pattern as depicted by alternating schematics 1202 and 1204 may be used to detect retroreflective device 602.

Reference is now made to FIG. 13, which includes schematics 1302 and 1304 depicting a retroreflective device 602 as described with reference to FIG. 6, in accordance with some embodiments of the present invention. Schematics 1302 and 1304 depict retroreflective device 602 located indoors, captured by a camera of a S20 smartphone at 10× zoom, located about 15 meters away. Schematic 1302 is captured under a 1.5 watt white LED flashlight illumination. Schematic 1304 is captured while the flashlight is off. Both schematics 1302 and 1304 are captured at an angle of incidence greater than about 80 degrees. The reflection of the illumination source by retroreflective device 602 is clearly depicted in schematic 1302, at a very large angle of incidence, using a weak illumination source. The location of retroreflective device 602 may be detected, for example, by analyzing images to identify a pattern of the illumination, for example, a strobe pattern as depicted by alternating schematics 1302 and 1304 may be used to detect retroreflective device 602.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A retroreflector device, comprising:
   an incident object made of a material transparent to electromagnetic radiation, the incident object designed to refract an incident ray hitting an incident surface to generate a refracted ray that hits a back surface; and
   a retroreflective surface positioned in proximity to the back surface of the incident object;
   wherein the retroreflective surface and the incident object are configured to refract the incident ray to generate the refracted ray for hitting the retroreflective surface at an angle of incidence below a threshold; wherein the electromagnetic radiation comprises short wave infrared (SWIR), and wherein the incident surface is positioned behind a barrier made out of a material selected for being opaque to visible light and non-opaque to SWIR.

2. The retroreflector device of claim 1, wherein the retroreflector device is configured to return the electromagnetic radiation substantially along the same path of the incident ray for an angle of incidence of the incident ray hitting the incident surface at about 50-89 degrees.

3. The retroreflector device of claim 1, wherein the threshold is defined as a value above which the retroreflector surface ceases to effectively return the electromagnetic radiation substantially along the same path of the incident ray.

4. The retroreflector device of claim 1, wherein the threshold is about 45 degrees.

5. The retroreflector device of claim 1, wherein the retroreflective surface comprises small reflective prisms, and the incident object is larger than an individual reflective prism by at least 10 times.

6. The retroreflector device of claim 5, wherein a length of the individual reflective prism is about 10-100 micrometers, and a length of the incident object is at least 1 millimeter.

7. The retroreflector device of claim 1, wherein the incident surface includes a portion thereof shaped substantially as a surface of a sphere, wherein an angle of incidence of the incident ray is about 90 degrees when hitting the surface of the sphere.

8. The retroreflector device of claim 1, wherein the retroreflective surface is placed in direct contact with the back surface of the incident object without an air gap therebetween.

9. The retroreflector device of claim 1, wherein the incident object is made of a resilient material designed to protect the retroreflective surface from damage from an external environment.

10. The retroreflector device of claim 1, wherein the retroreflector device comprises a plurality of incident objects each having the incident surface shaped substantially as a sphere, and the retroreflective surface adhered to the back surface, wherein the plurality of incident objects are positioned over a surface of an object.

11. The retroreflector device of claim 1, wherein the incident object is shaped approximately as a half sphere with a substantially flat bottom connected to a cylinder, and the retroreflective surface comprises a first portion covering the substantially flat bottom and a second portion arranged as a band covering the cylinder.

12. The retroreflector device of claim 1, wherein the retroreflective surface is disposed within the incident object.

13. A system comprising:
    the retroreflector device of claim 1;
    an illumination element that generates electromagnetic radiation;
    a sensor that captures at least one image at least at the electromagnetic radiation; and
    at least one processor that analyzes the at least one image for detecting the retroreflector according to a reflection of the electromagnetic radiation generated by the illumination element reflected back from the retroreflector device.

14. The system of claim 13, wherein the illumination element is positioned to direct the electromagnetic radiation as incident rays at a high angle of incidence in the range of 50-89 to the incident surface of the incident object of the retroreflector device.

15. The system of claim 13, wherein the retroreflector device is positioned in parallel to a surface of an earth, and an angle formed by the illumination element, the retroreflector device, and the surface of the earth is the high angle of incidence.

16. The system of claim 13, wherein the illumination element generates the electromagnetic energy at a selected illumination pattern, and the at least one processor analyzes the at least one image for detecting the retroreflector by detecting the selected illumination pattern.

17. A retroreflector device, comprising:
    a substrate comprising a binding surface; and
    at least one retroreflective surface positioned at an angle relative to the binding surface of the substrate; and a coating that is substantially opaque to electromagnetic energy in the visible range and substantially transparent to electromagnetic energy in the near infrared range;

wherein the angle is selected for an incident ray to hit the at least one retroreflective surface at an angle of incidence below a threshold in which the at least one retroreflective surface generates a reflected ray back towards the source that generated the incident ray, when an angle between the incident ray and a normal of the binding surface is above the threshold.

18. The retroreflector device of claim 17, wherein a height of the substrate and the at least one retroreflective surface positioned at the angle is less than about 4 millimeters (mm).

19. The retroreflector device of claim 17, wherein the angle of the at least one retroreflective surface relative to the binding surface is greater than about 30 degrees when the threshold of the incidence ray and the normal of the binding surface is less than about 80 degrees.

20. The retroreflector device of claim 17, further comprising a protective transparent coating overlaying the at least one retroreflective surface and the binding surface of the substrate, the protective transparent coating is made of a resilient material selected to withstand pressure applied by vehicles driving over the retroreflector device.

21. The retroreflector device of claim 17, wherein the coating is colored similarly to a color of a background surface on which the retroreflector device is placed.

* * * * *